Aug. 27, 1968

C. E. CLUTTER 3,398,595

SADDLE FEED MECHANISM AND METHOD OF OPERATION

Filed July 21, 1966

INVENTOR.
CARL E. CLUTTER

BY J. Warren Kinney Jr.

ATTORNEY

Aug. 27, 1968   C. E. CLUTTER   3,398,595
SADDLE FEED MECHANISM AND METHOD OF OPERATION
Filed July 21, 1966   3 Sheets-Sheet 3

INVENTOR.
CARL E. CLUTTER
BY
J. Warren Kinney Jr.
ATTORNEY

United States Patent Office 3,398,595
Patented Aug. 27, 1968

3,398,595
SADDLE FEED MECHANISM AND METHOD OF OPERATION
Carl E. Clutter, Mason, Ohio, assignor to Jack N. Binns, Cincinnati, Ohio
Filed July 21, 1966, Ser. No. 566,982
11 Claims. (Cl. 74—409)

ABSTRACT OF THE DISCLOSURE

An antibacklash saddle movable along a bed in parallelism with an elongated toothed rack fixed thereto is provided with two spaced parallel shafts carrying pinions meshing with said rack. The saddle is further provided with a main shaft journalled thereupon for rotational and longitudinal shifting movements and which carries a right hand helical toothed drive gear, and a left hand helical toothed drive gear. Companion gears mounted upon the saddle for rotation in fixed planes mesh respectively with the helical toothed drive gears. The tooth angularity of the helical gears are such that longitudinal shifting without rotation of the main shaft imparts rotation of the companion gears. There is direct connection between a companion gear and its respective rack pinion to transmit thereto the rotation of the companion gear.

---

This invention relates to a saddle feed mechanism for machine tools or the like, and a method of operation thereof.

An object of the invention is to provide improved means for traversing a saddle or carriage relative to a machine bed, with great precision and accuracy.

Another object of the invention is to provide an improved mechanism for reciprocating a saddle or carriage along a machine bed, with a practically complete elimination of blacklash.

A further object is to provide automatically operative means for eliminating blacklash in the feeding of a saddle or carriage, and wherein the power of blacklash elimination varies automatically and proportionately to variations in the forces opposing feeding of the saddle or carriage.

Another object of the invention is to provide automatic mechanism for the purposes stated, which incorporates a minimum number of simple and relatively inexpensive parts possessing the attributes of great durability and strength, and therefore capable of driving very large or heavily loaded saddles or carriages, with great precision of feed movement.

Another object is to provide mechanism for the elimination of blacklash in the feeding of saddles or carriages, which automatically adjusts itself to load variations so as to control the wearing of constituent parts, and thereby enhance the longevity and serviceability of such parts without requiring frequent replacement or adjustments thereof.

The foregoing and other objects are attained by the means described herein and illustrated upon the accompanying drawings, in which:

FIG. 4 is a side elevational view, showing the relationship between a rack and pinions, occurring as a saddle or carriage is fed along a machine bed.

For simplicity and clarity of disclosure, the present invention is shown in the accompanying drawings as applied to a metal turning lathe, and particularly one used in the turning of large and very heavy workpieces subject to heavy cutting and rapid shaping. However, it should be clearly understood that the invention is applicable as well to other types of machines wherein one element thereof is to be fed or moved relative to another, without the occurrence of backlash, in order to ensure accuracy of performance with the greatest possible speed.

The invention when applied to a lathe, makes possible the production of very heavy cuts upon a workpiece, with great accuracy and high finish resulting, so that the efficiency of the machine and the quality of the work performed are very substantially enhanced, with great savings of time, labor, and expense. Also, as stated in the preceding objects, these advantages are achieved without undue wearing of parts, and without the need for frequent adjustments or parts replacements which would disable the machine and remove it from service.

Figure 3:
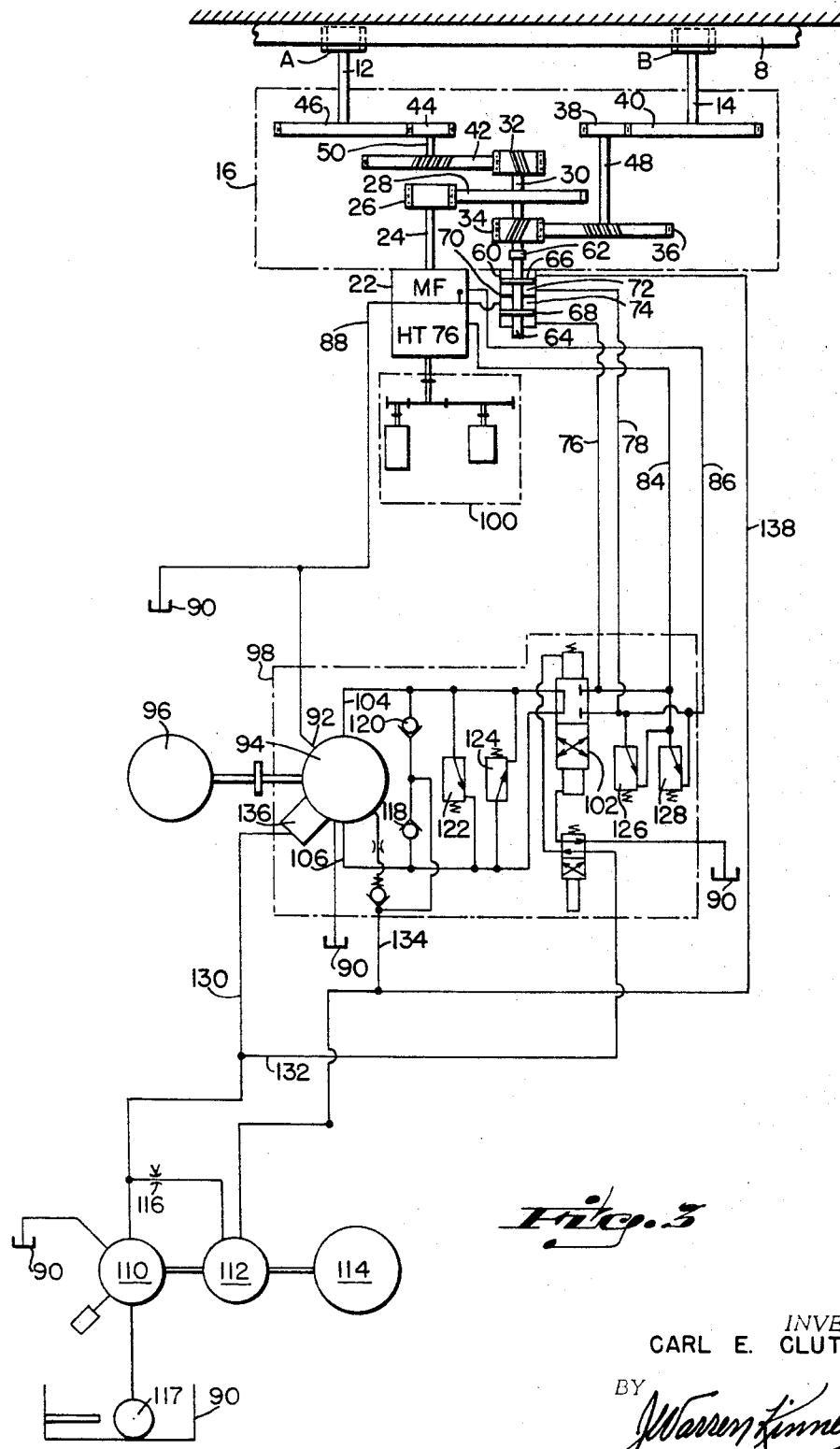
FIG. 3 is a schematic hydraulic diagram, showing an arrangement of hydraulic means for driving and controlling a saddle or carriage shown diagrammatically at the upper end of FIG. 3.

With reference to the drawings, the numeral 8 indicates an elongate rack fixed to the bed 10 of a lathe FIG. 3, and the teeth of which are engaged by the teeth of a pair of pinions A and B. The pinions are fixed upon the pinion shafts 12 and 14, which shafts are in spaced parallelism with one another, and rotatably supported upon the gear box 16 of a saddle or carriage 17 by means of antifriction bearings 18 and 20. The pinions are adapted to be driven, for moving the saddle or carriage lengthwise of the stationary rack. As is usual, the saddle or carriage supports a tool (not shown) for shaping a workpiece as the saddle or carriage is fed lengthwise of the rack and machine bed.

The tool also may be fed toward and from the axis of rotation of the workpiece in accordance with common practice, but cross-feeding of the tool does not concern the present invention, and is therefore ignored in the present disclosure.

FIG. 3 illustrates the gearing for rotating the pinions A and B, to move carriage or saddle 17 along rack 8. The prime mover may be a fluid-operated motor 22 having drive shaft 24 that may be rotated in forward or reverse directions, at selected speeds of rotation. Shaft 24 carries a gear 26 meshing with a gear 28, the latter gear being fixed upon a main shaft 30.

Main shaft 30 carries fixed driving gears 32 and 34. Gear 34 drives pinion B through a train of gears 36, 38, 40, whereas gear 32 drives pinion A through a train of gears 42, 44, 46. The trains of gears mentioned, will be seen effective to rotate the rack-engaging pinions in unison, for traversing the carriage and gear box 16 to the left or to the right, depending upon the direction of rotation of motor shaft 24.

It is important to note that intermeshing gears 34 and 36 are helical gears, and that intermeshing gears 32 and 42 are also helical gears. Gears 32 and 34 desirably are wider or thicker than the gears they intermesh with, so that their companions 36 and 42 will remain in mesh therewith upon limited longitudinal shifting of main shaft 30. It is to be noted also that gears 32 and 34 are of opposite hands, one having a right hand pitch and the other a lefthand pitch. The gears 36 and 42 driven thereby, are of course helical gears oppositely pitched to mesh with gears 34 and 32, respectively. The shafts 48 and 50 of gears 36 and 42, respectively, are journaled for rotation in box 16, but are not longitudinally shiftable.

The tooth angles of gear sets 34, 36 and 32, 42; are such that any longitudinal shifting of main shaft 30, will result in rotating the pinions A and B in opposite directions, to take up all lost motion between the teeth of their respective transmission gears. Then, with shaft 30 held in the shifted position, said shaft may be rotated by means of motor 22 to rotate pinions A and B in a common direction, with no play or backlash occurring in the transmission trains.

Suitable means is provided for longitudinally shifting the main shaft 30, preferably in one direction only, to maintain in firm driving contact the teeth of all gears in the transmission trains 34, 36, 38, 40 and 32, 42, 44, 46. This of course maintains a firm driving contact of the teeth of pinions A and B with the teeth of stationary rack 8, as depicted by FIG. 4. In FIG. 4, it may be assumed that pinion A is power-rotated in clockwise direction, to shift the gear box and saddle to the left along rack 8. Pinion A thereupon may be considered the leading pinion or driver, while pinion B counteracts against the rack teeth to eliminate play or backlash in the transmission gearing.

Should the gear box and saddle require feeding to the right, pinion B would be power-rotated in counterclockwise direction, thereby assuming the role of leading or driving pinion, while pinion A counteracts against the rack teeth to eliminate play or backlash in the transmission gearing.

It may here be noted, merely by way of observation, that rack teeth 52 and 54 in FIG. 4 are acted upon by the pinions in a direction inwardly, tending to compress teeth 52 and 54 toward one another. As an alternative, the pinions may be caused to act upon rack teeth 56 and 58, instead, tending to spread teeth 56 and 58 apart, or away from one another. In either case, the elimination of play or backlash in the transmission gearing would be achieved. Whether the teeth will engage as shown in FIG. 4, or in the alternative fashion mentioned, will depend upon the direction in which main shaft 30 is longitudinally shifted. It will depend also upon whether or not the lefthand and righthand drive gears 32 and 34 are transposed upon shaft 30.

In the example illustrated, main shaft 30 is subject to power advancement in the general direction of rack 8, by means of a hydraulic motor or ram 60 coupled at 62 to said shaft. The coupler 62 preferably is one of the rotary type, which permits rotation of shaft 30 relative to motor plunger 64, while transmitting longitudinal shifting motion of the plunger to said shaft.

The plunger of hydraulic motor 60 may carry two pistons 66 and 68, fixed upon the plunger in spaced relationship. An intermediate transverse wall 70 divides the motor cylinder into two separate chambers 72 and 74, in which the pistons 66 and 68 may reciprocate. From the disclosure of FIG. 3, it will be understood that fluid under pressure conveyed to the piston chambers by means of fluid feed pipes 76 and 78, will serve to advance the pistons inwardly of gear box 16, thereby to shift the main shaft 30 and its associated gears 34, 32, 28, in the general direction of rack 8. Such advancement of the main shaft and its gears will, as previously explained, take up all play between the gear teeth of the transmission trains for both drive pinions A and B, resulting also in backlash elimination as suggested by FIG. 4. Pressure of fluid in feed pipes 76 and 78 will maintain the shaft 30 in fully advanced position, so long as pressure of fluid is maintained in said pipes. The pressure of fluid in pipes 76 and 78 may vary, as will be explained hereinafter.

Figure 1:
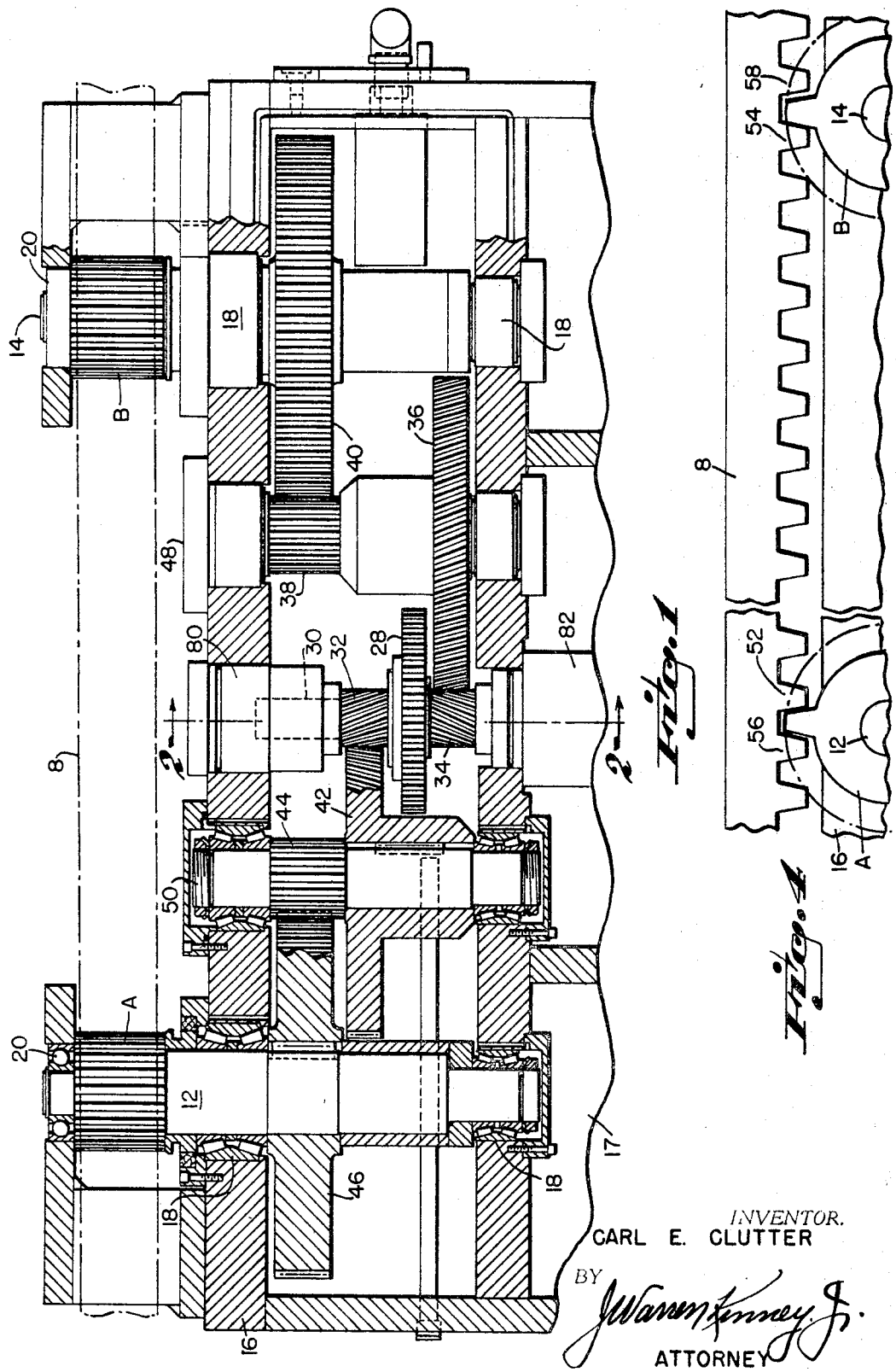
FIG. 1 is a top view, in cross section, showing the elements of a gear box embodying the improvements of the present invention, as applied to the saddle or carriage of a lathe or other metal-shaping machine.
Figure 2:
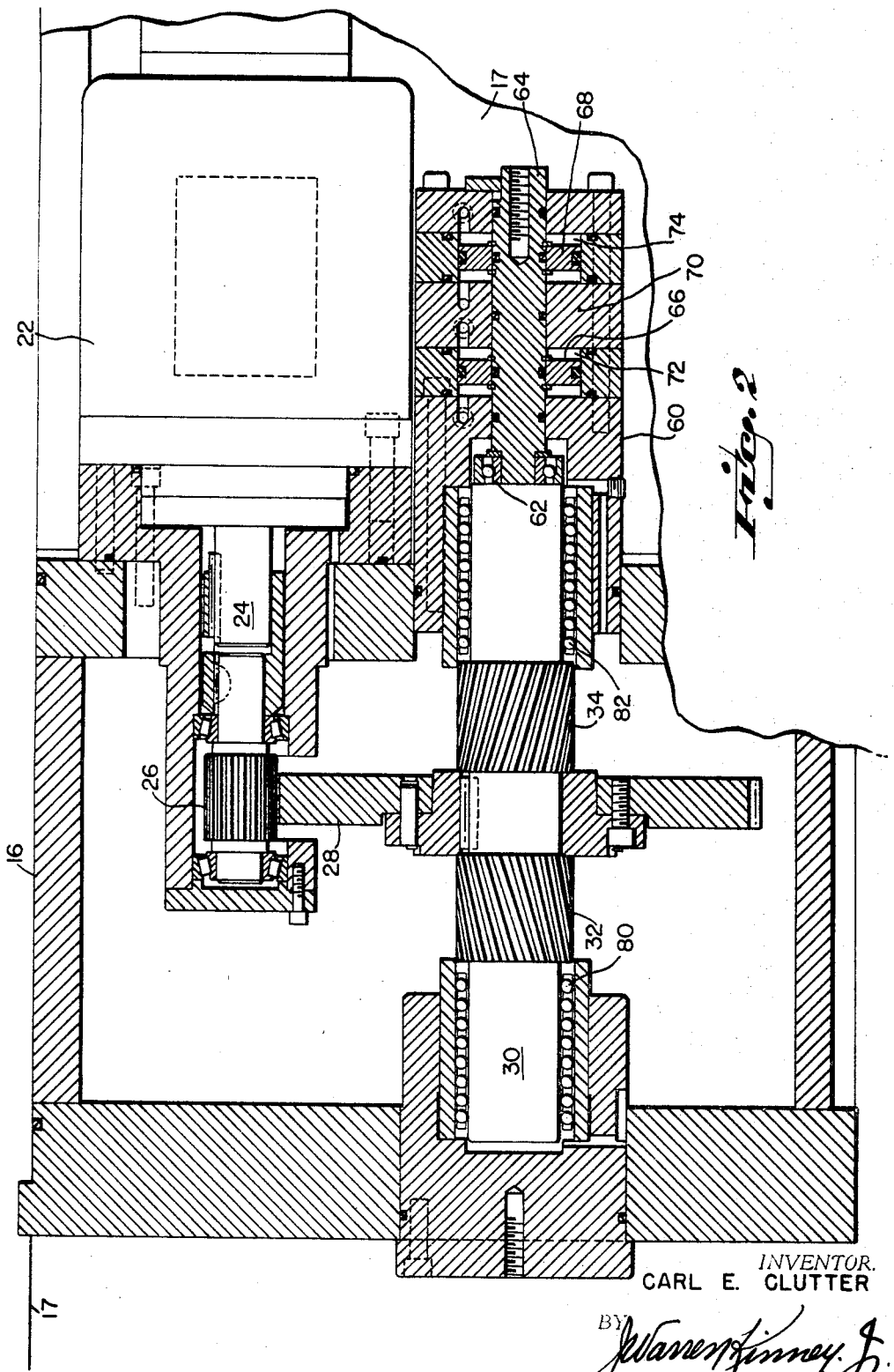
FIG. 2 is an enlarged cross-section taken on line 2—2 of FIG. 1, with the addition of certain mechanism at the right half of FIG. 2.

As indicated upon FIG. 2, main shaft 30 carrying the gears 32, 34 and 28, may be journaled in universal ball bearings 80 and 82 which permit rotation and limited longitudinal shifting of the shaft, as required. The cylindrical housing of fluid motor 60 may be fixed to gear box 16 in any suitable manner, so that its plunger 64 is aligned with shaft 30 in accordance with FIG. 3.

The reference characters 84 and 86 indicate feed pipes for fluid under pressure, for driving the fluid motor 22 in forward and reverse directions. A drain line 88 from motor 22, and line 92 from pump 94, return the leakage fluid to a sump 90. Pump 94 may be an element of a pressure demand system or unit, which is indicated generally by the mechanism shown within the broken line enclosure 98. The second broken line enclosure 100 indicates a control unit of conventional type, for monitoring the speed or position of fluid motor 22.

Unit 98 may comprise a shut-off valve 102, to which pressure of fluid from pump 94 is delivered by means of supply pipes 104 and 106. As shown in FIG. 3, valve 102 is closed and therefore may not supply fluid under pressure to the feed lines 76, 78 and 84, 86, for energizing the motors 60 and 22.

The fluid supply system may include a fluid supply tank or sump, shown conventionally by the several numerals 90; a variable volume pump 110; a heat exchanger or cooler 112; an electric motor 114; a fluid restrictor 116; and the electric motor 96 driving the variable volume reversible flow pump 94. The system may include also a filter 117, the check valves denoted 118 and 120, pressure relief valves 122, 124, 126, 128, and a pilot operated blocking valve 102, the functions of which are explained hereinafter.

Operation of the fluid supply system is explained as follows:

When the carriage is operating, or is in a state of readiness to operate, electric motor 114 runs continuously to actuate pump 110 and electric motor 96 runs continuously to actuate pump 94. Pump 110 supplies control fluid through lines 130 and 132 to servo valve 136 and blocking valve 102. A portion of the control fluid is bled off through restrictor 116 to a low pressure, is passed through the heat exchanger or cooler 112 and enters the system through line 134 to cool pump 94, and to supercharge and make up leakage of lines 104 and 106 through check valves 118 and 120.

With blocking valve 102 in the open position (FIG. 3 shows it closed or blocked), lines 104 and 106 connect with lines 86 and 84. Pump 94 will move the fluid in either direction and at various rates through pipes 104, 106, 84 and 86, dependent upon the electric command signal given to the servo 136 which controls direction and rate of flow from pump 94. Thus direction and rate of rotation of fluid motor 22 on gear box 16 may be controlled to give the desired movement of carriage 17.

Blocking valve 102 is closed when no movement of carriage is desired. Relief valves 122 and 124 may be an integral part of pump 94, and are for the protection of pump 94 against unreasonably high pressure. Relief valves 126 and 128 are for the protection of the gears in gear box 16, by preventing unreasonably high pressure in lines 84 and 86 and thereby limiting the maximum torque output of fluid motor 22. The fluid loop comprising pump 94, motor 22, and connecting lines 104, 86 and 106, 84, is a pressure demand system. A basic supercharge pressure is applied to both legs of pump 94 and motor 22 as previously described. In addition, a feed pressure is superimposed on one leg or the other of pump 94 and motor 22. The direction of carriage movement and magnitude of its resistance to movement, determine the leg and the amount of superimposed feed pressure. By virtue of the helix angle on gears 32, 42, 34 and 36 it may be seen that the greater the resistance to carriage movement, the greater will be the required pressure to move shaft 30 toward rack 8 to eliminate backlash.

In FIG. 3 it will be seen that lines 76 and 78 connect lines 84 and 86 to motor or ram 60 in such a way that the greater the pressure in either leg of the fluid loop, the greater will be the pressure to eliminate backlash in the gear train and rack and pinion drive. Thus with high feed forces and resultant large deflection of the teeth on helical gears 32 and 34, the ram or fluid motor 60 receives relative high pressure to overcome a large amount of backlash. With low feed forces and resultant small deflection of the gear teeth, the ram 60 receives low pressure to overcome a small amount of backlash. The combination ball bearings on main shaft 30 provide for rotation and longitudinal movement of said shaft with a minimum of friction thus providing for quick and easy response to variations of gear and rack tooth spacing and loading.

It should be noted that supercharge pressure from line 134 enters lines 76 and 78 as well as lines 104, 106, 84 and 86. This applies a preload on both pistons 66 and 68 of ram 60 with a consequent preload on the gear teeth. Obviously, a small preload is desirable to insure a backlash-free system, and a large amount of preload is undesirable from the standpoint of wear and fast traverse rates. It is for this reason that supercharge pressure is applied through line 138 to oppose supercharge pressure applied through line 78. The net fluid pressures which move plunger 64 are supercharge pressure on piston 68 and feed pressure on either piston 66 or 68. Variations in the net fluid pressure acting upon plunger 64, thusly are seen to result from resistance to carriage traverse, which is usually governed by tool feed pressures and the nature of the workpiece undergoing shaping.

From the foregoing, it should be apparent that the present apparatus provides for a highly desirable automatically variable backlash control, which is simple of construction and operation, and capable of greatly enhancing precision in the shaping of heavy workpieces. The apparatus also performs to expedite output, while achieving various other objectives some of which are set forth in the forepart of the specification.

What is claimed is:

1. An antibacklash saddle feed mechanism comprising in combination: a machine bed including a toothed elongate rack fixed to the bed; a saddle movable along the bed in parallelism with the rack; a pair of rack-engaging pinions having teeth engaging the rack; a pair of pinion shafts journaled upon the saddle for rotation, said shafts being spaced apart in substantial parallelism, and each having connection with one of said pinions for rotation therewith; a main shaft journaled upon the saddle for rotational and longitudinal shifting movements; a right hand helical toothed drive gear, and a left hand helical toothed drive gear, both fixed upon the main shaft; a first companion gear having helical teeth in mesh with the right hand helical toothed drive gear, and a second companion gear having helical teeth in mesh with the left hand helical toothed drive gear, and means mounting said companion gears upon the saddle for rotation in fixed planes; the tooth angularity of the helical gears being such that longitudinal shifting, without rotation, of the main shaft and the drive gears fixed thereon, imparts rotation to the companion gears in mesh therewith, means transmitting rotation of each companion gear to a rack pinion; means for rotating the main shaft; and means for longitudinally shifting said main shaft and the helical toothed drive gears fixed thereon.

2. The combination as specified by claim 1, wherein the main shaft shifting means forcefully shifts said shaft axially in one direction while said shaft rotates to drive the rack pinions.

3. The combination as specified by claim 2, wherein the force of axial shifting of the main shaft increases as resistance to movement of the saddle increases, and conversely, the force of axial shifting of the main shaft decreases as resistance to movement of the saddle decreases.

4. The combination as specified by claim 1, wherein the means for rotating the main shaft includes a variable speed hydraulic rotary motor; and the means for longitudinally shifting the main shaft includes a hydraulic ram applying force axially in one direction upon said shaft while the latter rotates.

5. The combination as specified by claim 4, wherein is included means operative to increase the force of ram action upon the main shaft, correspondingly with an increase of resistance to operation of the hydraulic motor.

6. The combination as specified by claim 1, wherein the means for longitudinally shifting the main shaft includes a hydraulic ram applying force axially in one direction upon said shaft while the latter rotates.

7. The combination as specified by claim 6, wherein is included means governed by variations in resistance to movement of the saddle, for varying the force with which the hydraulic ram shifts the main shaft axially.

8. The combination as specified by claim 6, wherein is included means operative to increase the force of ram action upon the main shaft, correspondingly with an increase of resistance to operation of said main shaft rotating means.

9. The combination as specified by claim 1, wherein the means for rotating the main shaft is reversible; and the main shaft shifting means is operative to axially shift the main shaft and the spiral toothed drive gears thereon, forcefully in one direction only.

10. The method of overcoming backlash in gear trains which include a toothed elongate stationary rack, and a pair of rack-engaging rotatable pinions spaced apart upon a saddle, with the pinion teeth engaging the rack teeth, said method comprising: rotating one of the pinions in a given direction of rotation to move the saddle longitudinally toward one end of the rack, while at the same time applying to the remaining pinion a force yieldingly tending to rotate said remaining pinion in the opposite directon of rotaton, increasng said force as resistance to movement of the saddle increases, and decreasing said force as resistance to movement of the saddle decreases.

11. The method as specified by claim 10, wherein the gear train associated with each pinion comprises a plurality of meshed gears each terminating with a helical toothed gear pair, corresponding terminal gears of each pair being of right and left hand tooth angularity, and fixed upon a single rotatable longitudinally shiftable drive shaft; shifting said drive shaft longitudinally to take up play between the gears of the trains; and rotating said shaft concurrently with shifting thereof in one direction, for driving the rack pinions through the medium of the gears trains, to move the saddle as stated.

References Cited

UNITED STATES PATENTS

| | | | |
|---|---|---|---|
| 2,902,875 | 9/1959 | Finally et al. | 74—409 |
| 2,946,232 | 7/1960 | Jones | 74—409 |
| 3,166,952 | 1/1965 | Lang | 74—409 X |
| 3,316,772 | 5/1967 | Jones | 74—409 X |

FRED C. MATTERN, *Primary Examiner.*

LEONARD H. GERIN, *Assistant Examiner.*